May 6, 1969  J. S. PRITCHARD  3,441,986
FASTENING CLIP
Filed Aug. 31, 1967
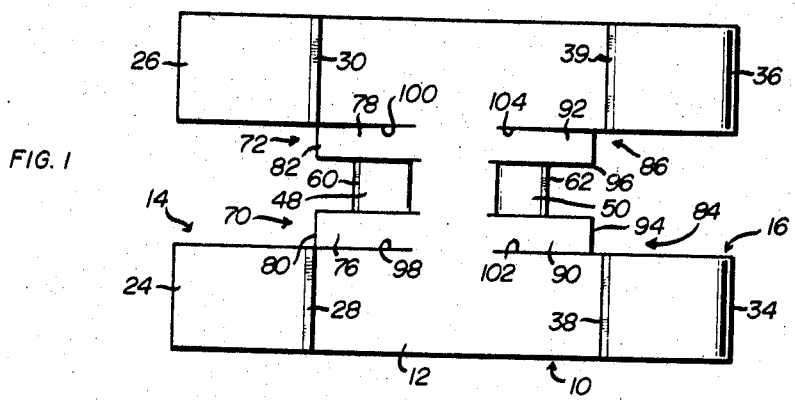
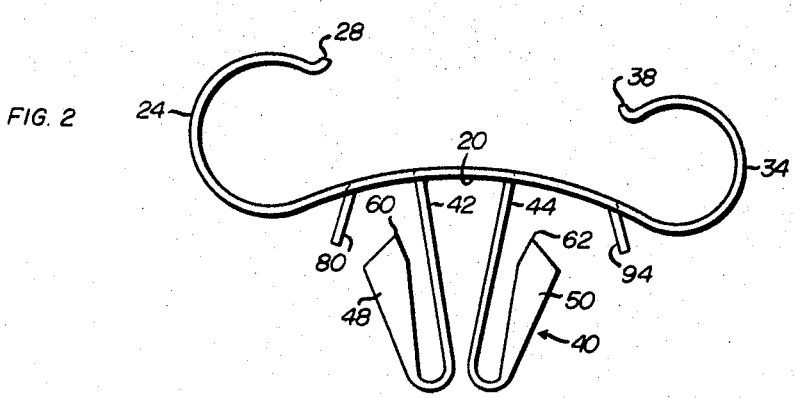
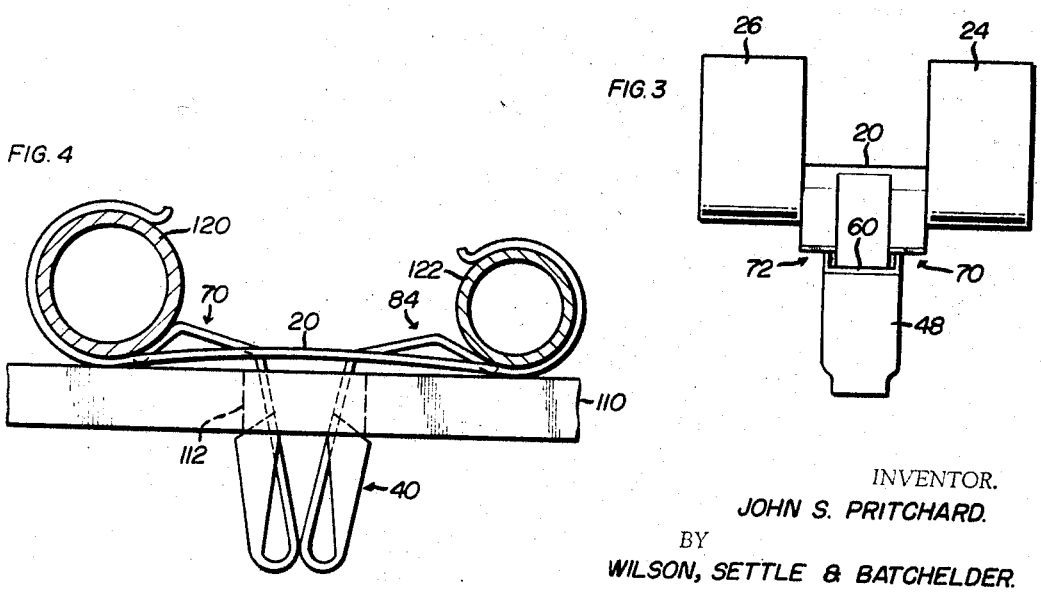
INVENTOR.
JOHN S. PRITCHARD.
BY
WILSON, SETTLE & BATCHELDER.
ATT'YS.

United States Patent Office 3,441,986
Patented May 6, 1969

3,441,986
FASTENING CLIP
John S. Pritchard, Utica, Mich., assignor to Robin Products Company, Warren, Mich., a corporation of Michigan
Filed Aug. 31, 1967, Ser. No. 664,715
Int. Cl. F16l *3/02;* F16b *17/00*
U.S. Cl. 24—73                                    10 Claims

ABSTRACT OF THE DISCLOSURE

A fastening clip for securing cables, tubes, rods and the like to a support. The clip is a one piece resilient strip formed with a base having holding clips on each end thereof with locking barbs depending from an intermediate portion of the base and legs depending from the base on each side of the locking barbs and adjacent the holding clips to cooperate with the holding clips to form locks and to aid in securement to a support.

SUMMARY OF THE INVENTION

In accordance with my invention, I provide a resilient fastening clip formed of one piece of metal and includes a base having bifurcated ends which are formed to provide two spaced apart C-shaped holding clips on each end of the base with the base slightly arched between the ends thereof. The metal is formed intermediate the ends thereof to provide depending locking barbs for insertion into an aperture in a support for engagement therewith to lock the device to the support. The metal is also formed intermediate the ends thereof to provide two spaced apart L-shaped legs on the base on each side of the locking barbs and adjacent the C-shaped holding clips. The legs each have one end as part of the base and include a portion positioned on the same plane as the base and a depending portion extending at a substantial angle to the base depending to a point where they are on a plane substantially with the plane of the engaging portions of the barbs. Therefore, when the bars are inserted into the aperture of the support, the ends of the legs will engage the support regardless of the thickness of the support and will move upwardly on the base forming an angle adjacent the opening of the C-shaped holding clips to aid in locking objects in said holding clips against accidental removal therefrom. The legs also urge the barbs into engagement with one side of the support and cause the rigid support of the device on the opposite side of the support.

It is therefore an object of my invention to provide a new and improved fastening clip for tubing and the like.

Another object of my invention is to provide a new and improved arrangement for locking tubing to a support.

Other objects of this invention will appear in the following description and appended claims, reference being had to the accompanying drawings forming a part of this specification wherein like reference characters designate corresponding parts in the several views.

In the drawings:

FIGURE 1 is a top plan view of a fastener clip embodying features of my invention;

FIGURE 2 is a side view in elevation of the clip shown in FIGURE 1;

FIGURE 3 is an end view in elevation of the clip shown in FIGURES 1 and 2; and

FIGURE 4 is a view of the clip shown in FIGURES 1, 2 and 3 with the clip being secured to a support.

Before explaining the present invention in detail, it is to be understood that the invention is not limited in its application to the details of construction and arrangemen of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general a fastening clip which is formed in one piece of any suitable resilient material such as spring steel. The clip 10 includes a sheet metal base 12 having bifurcated ends as at 14 and 16 and is slightly arched between the ends thereof as at 20. The bifurcated end 14 is arcuate to provide a pair of spaced apart C-shaped holding clips 24 and 26 having upturned edges 28 and 30 to aid in moving objects into the holding clips 24 and 26. The bifurcated end 16 is arcuate to provide a pair of spaced apart C-shaped holding clips 34 and 36 having upturned edges 38 and 39 to aid in moving objects into the holding clips 34 and 36. The holding clips 34 and 36 may be of lesser diameter than clips 24 and 26 and may be used for holding tubing of different diameters, such as brake and gasoline lines on automobiles.

The base 20 at its central portion is provided with barbs 40 which include depending legs 42 and 44 which are bent upwardly and outwardly forming resilient members 48 and 50 which are normally spaced from the legs 42 and 44 but which may be sprung inwardly toward the legs. The resilient members 48 and 50 are cam shaped and pointed on the upper ends thereof as at 60 and 62 to engage one side of a support. In cross section, the resilient members are U-shaped so that they may be moved to engage the legs 42 and 44 when inserting same into an aperture of a support and spring outwardly after passing through the aperture to engage the support.

The base 20 at its central portion is also provided with legs 70 and 72 at the bifurcated end 14. The legs 70 and 72 are integral with the base 20 and include substantially horizontal portions 76 and 78 and depending portions 80 and 82 depending from the horizontal portions thereof and are positioned at substantially right angles to the base 20. Legs 84 and 86 are provided at the bifurcated end 16. The legs 84 and 86 are integral with base 20 and include substantially horizontal portions 90 and 92 and portions 94 and 96 depending from the horizontal portions thereof and positioned at substantially right angles to the base 20. The legs 70 and 72 are spaced apart and adjacent clips 24 and 26, respectively. The legs 70 and 72 are severed from the base 20 as at 98 and 100 but integral with the base at their inner ends. The legs 84 and 86 are severed from the base 20 as at 102 and 104 but integral with the base at their inner ends. By being thus severed, the resilient legs are free to move upwardly when the depending portions thereof engage a support.

FIGURE 4 shows the fastening clip 10 mounted on a support 110. In this view, the barbs 40 extend through aperture 112 and engage the underside of the support 110 to lock the fastening clip 10 to the support 110. The holding clips 24, 26, 34 and 36 engage the upper side of the support 110 and the angular legs are moved upwardly as shown. Thus, each end forms a right angle and certain legs engage tubes 120 and 122 to provide locks against the accidental removal of the tubes. When the barbs 40 are inserted into the aperture far enough, the yieldable resilient legs engage the support by their free ends and move upwardly to assume the position shown in FIGURE 4. Thus, the resiliency of the legs urges the barbs upwardly to rigidly engage the underside of the support and at the same time, the legs exert a force to rigidly support the base and holding clips on the upper side of the support. Since the base is arched and made of resilient material, it permits the base to be depressed slightly at the arch when passing the barbs through the aperture 112. Thereafter, the barbs spread outwardly to engage the underside of the support and the depressed portion of the base will tend to assume its normal shape and urge the barbs against the underside of the support along with the action of the resilient legs. Such action of the base and legs also tend to urge the holding clips in engagement with the upper part of the support to rigidly lock the fastening clip 10 to the support 110. The tubes may be inserted into the holding clips either before or after the fastening clip is supported on the support as the legs lock the tubes against accidental removal but they may be inserted into or removed from the holding clips with pressure applied thereto.

I claim:

1. A fastening clip for use with a support wherein the improvement comprises a base adapted to engage a first side of a suport and having one end formed to provide a holding clip with a receiving opening, locking means carried by said base for insertion through an aperture in said support to engage a second side of said support and a resilient angular leg carried by said base between said locking means and said clip, said leg having a portion thereof cooperating with said end to provide a lock adjacent said receiving opening of the holding clip when the end of said leg engages said first side of said support upon insertion of said locking means through said aperture to aid in retaining an object positioned in said clip and to urge said locking means against said second side of said support.

2. A fastening clip as defined in claim 1, wherein the fastening clip is made of resilient material and the locking means and the angular leg are formed integral with the base.

3. A fastening clip as defined in claim 1 further including a second holding clip on the opposite of said base, said second holding clip having a receiving opening, a resilient angular leg carried by said base between the locking means and one holding clip and a second resilient angular leg carried by said base between said locking means and said second holding clip to provide a lock adjacent each receiving opening and to aid in supporting the fastening clip on said support.

4. A fastening clip as defined in claim 3 wherein each end of the base carries two spaced apart resilient angular legs.

5. A fastening clip as defined in claim 4 wherein each end of the base is bifurcated providing two holding clips on each end of the base with the spaced apart resilient angular leg being positioned between each two holding clips.

6. A fastening clip comprising a base having one end formed to provide a holding clip, locking means carried by said base at a point spaced from said holding clip and adapted to engage one side of an apertured support, and yieldable means carried by said base adjacent the mouth of said holding clip, said yieldable means having a portion substantially parallel with said base and a leg portion formed at a substantially right angle to and extending below the base, said leg portion of said yieldable means adapted to engage another side of the apertured support whereby said yieldable means urges said locking means into engagement with said one side of the support and aids in retention of an article in said holding clip upon insertion of said locking means through the aperture in said support.

7. A fastening clip as defined in claim 6, wherein the fastening clip is made of resilient material and the locking means and the yieldable means are formed integral with the base.

8. A fastening clip as defined in claim 7, wherein the base is provided with a holding clip on each end thereof and the locking means is carried between the holding clips, said yieldable means including first yielding means positioned between the locking means and one holding clip and second yielding means positioned between the locking means and the other holding clip.

9. A fastening clip formed of resilient material comprising an arched base having, means on the ends of said base defining C-shaped holding clips extending above said base, locking barbs extending below said base between the ends thereof, and a pair of locking legs each having a first portion carried by the base and a second portion depending from said base and extending toward said barbs, said second portion being angularly related to said first portion, said legs being respectively positioned adjacent the open part of a C-shaped clip whereby to partially enclose said open part and to urge said locking barbs toward a side of a support when securing said clip to a support.

10. A fastening clip as defined in claim 9, in which said means defining said holding clips includes means providing two C-shaped holding clips at each end of the base and further including a second pair of locking legs substantially identical to said first pair of locking legs with a pair of legs positioned between the C-shaped holding clips at each end of the base, said barbs and legs being formed integral with the base and the legs being movable relative to the base to cooperate with the C-shaped holding clips providing a locking arrangement therewith when the clip is secured to a support.

References Cited

UNITED STATES PATENTS

| | | | |
|---|---|---|---|
| 2,061,463 | 11/1936 | Hall | 248—73 |
| 2,454,894 | 11/1948 | Tatom | 24—73.7 |
| 2,658,247 | 11/1953 | Hever | 24—73.7 |
| 3,205,546 | 9/1965 | Nelson | 24—73 X |
| 3,216,685 | 11/1965 | Raymond | 248—74 |

DONALD A. GRIFFIN, *Primary Examiner.*

U.S. Cl. X.R.

248—74